United States Patent
Ryan et al.

(10) Patent No.: US 10,936,797 B2
(45) Date of Patent: *Mar. 2, 2021

(54) COLLABORATIVE DOCUMENT EDITING USING STATE-BASED REVISION

(71) Applicant: Microsoft Technology Licensing, LLC, Redmond, WA (US)

(72) Inventors: Nicholas Ryan, Redmond, WA (US); Danny Khen, Bellevue, WA (US); Jenefer Monroe, Seattle, WA (US); Alexander Babanov, Bothell, WA (US); Kartik Nathan, Bellevue, WA (US); Dmitri Kotchetov, Redmond, WA (US); Konrad Tupaj, Kirkland, WA (US); Douglas Mangini, Snohomish, WA (US); Sam Gensburg, San Francisco, CA (US); Duane Campbell, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,434

(22) Filed: May 22, 2019

(65) Prior Publication Data
US 2019/0392028 A1 Dec. 26, 2019

Related U.S. Application Data

(63) Continuation of application No. 14/515,359, filed on Oct. 15, 2014, now Pat. No. 10,331,775.

(51) Int. Cl.
*G06F 40/166* (2020.01)
*G06F 40/103* (2020.01)

(52) U.S. Cl.
CPC .......... *G06F 40/166* (2020.01); *G06F 40/103* (2020.01)

(58) Field of Classification Search
CPC .......................... G06F 40/103; G06F 40/166
See application file for complete search history.

(56) References Cited

U.S. PATENT DOCUMENTS

| 8,321,784 B1 * | 11/2012 | Ranganathan | ....... G06Q 10/103 715/255 |
| 8,768,988 B2 * | 7/2014 | Boyd | ....................... G06F 16/128 707/831 |

(Continued)

*Primary Examiner* — Scott T Baderman
*Assistant Examiner* — Mario M Velez-Lopez
(74) *Attorney, Agent, or Firm* — NovoTechIP International PLLC

(57) ABSTRACT

The present disclosure provides methods, systems, and computer products for providing state-based revisions in a document collaboration system. In some aspects, a plurality of users may be simultaneously editing the same document on their respective computing devices. The document may comprise a plurality of editable objects having unique objects identifiers. In such aspects, when a user edits an object in a local version of the document, a state-based revision ("SBR") record is created. The SBR is populated with information such as, information describing the type of object being edited, a descriptor that uniquely identifies the specific instance of the object being edited, a collection of common references that can be adjusted by the document collaboration engine and an opaque binary stream comprising the modified state of the edited object. The SBR record is then transmitted to one or more additional devices.

20 Claims, 9 Drawing Sheets

(56) References Cited

U.S. PATENT DOCUMENTS

| | | | | |
|---|---|---|---|---|
| 9,152,644 B2* | 10/2015 | Chandrasekaran | ... | G06F 16/176 |
| 9,898,892 B2* | 2/2018 | Peterson | ............... | G07F 17/323 |
| 2003/0112273 A1* | 6/2003 | Hadfield | ................ | G06Q 10/10 |
| | | | | 715/751 |
| 2004/0085354 A1* | 5/2004 | Massand | ............... | H04L 65/403 |
| | | | | 715/751 |
| 2005/0033829 A1* | 2/2005 | Oommen | ................ | H04W 4/06 |
| | | | | 709/220 |
| 2010/0257457 A1* | 10/2010 | De Goes | ............ | H04L 65/1093 |
| | | | | 715/751 |
| 2011/0078246 A1* | 3/2011 | Dittmer-Roche | ........................... | |
| | | | | H04L 65/4015 |
| | | | | 709/205 |
| 2012/0331061 A1* | 12/2012 | Lininger | ................ | G06F 30/13 |
| | | | | 709/205 |
| 2014/0033067 A1* | 1/2014 | Pittenger | ............. | G06Q 10/101 |
| | | | | 715/751 |
| 2014/0047234 A1* | 2/2014 | Davis | .................. | G06F 21/6209 |
| | | | | 713/160 |
| 2014/0189051 A1* | 7/2014 | Hunter | .................. | G06F 16/951 |
| | | | | 709/217 |
| 2014/0282078 A1* | 9/2014 | Taylor | ................ | G06F 3/04812 |
| | | | | 715/751 |
| 2015/0195311 A1* | 7/2015 | Lemonik | .................. | G06F 9/44 |
| | | | | 715/753 |
| 2015/0201040 A1* | 7/2015 | Horling | ............... | H04L 67/1095 |
| | | | | 709/203 |
| 2016/0062963 A1* | 3/2016 | Umapathy | ........... | G06F 40/166 |
| | | | | 715/760 |

* cited by examiner

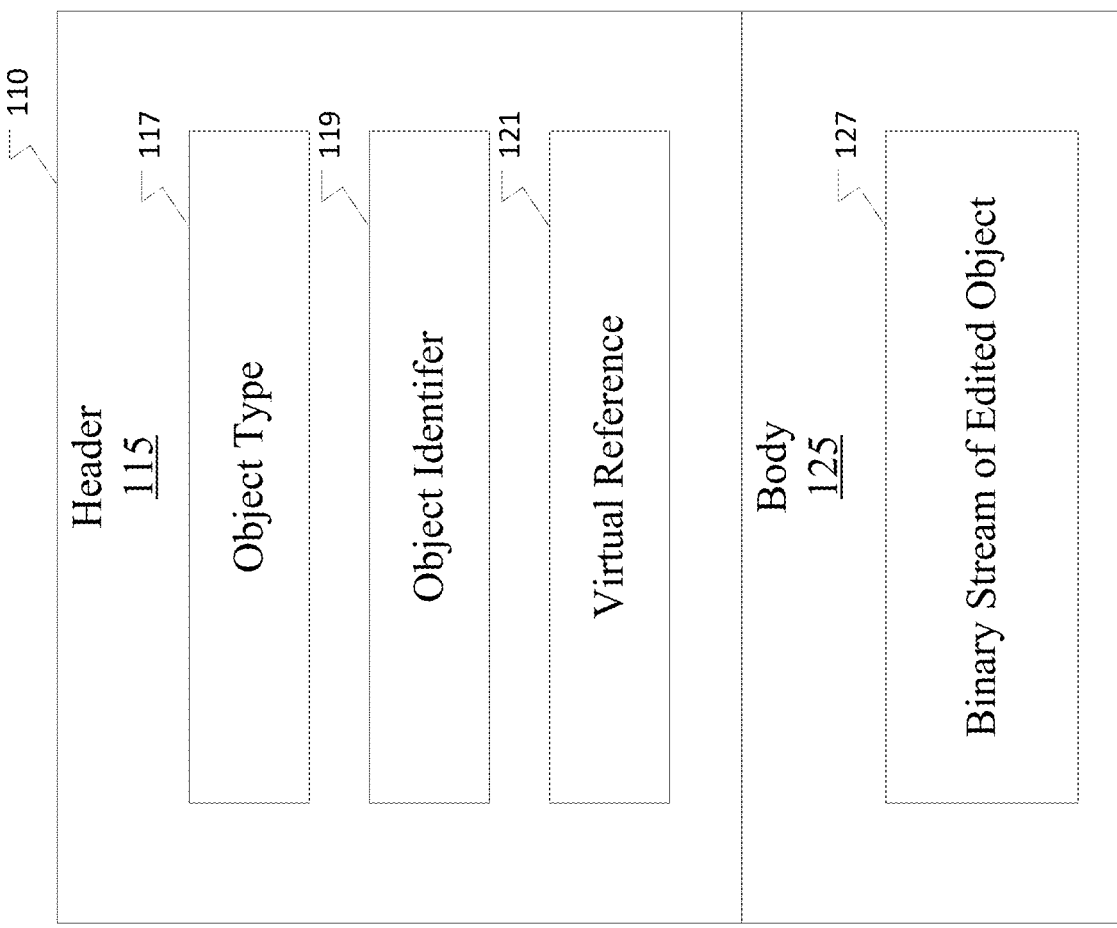

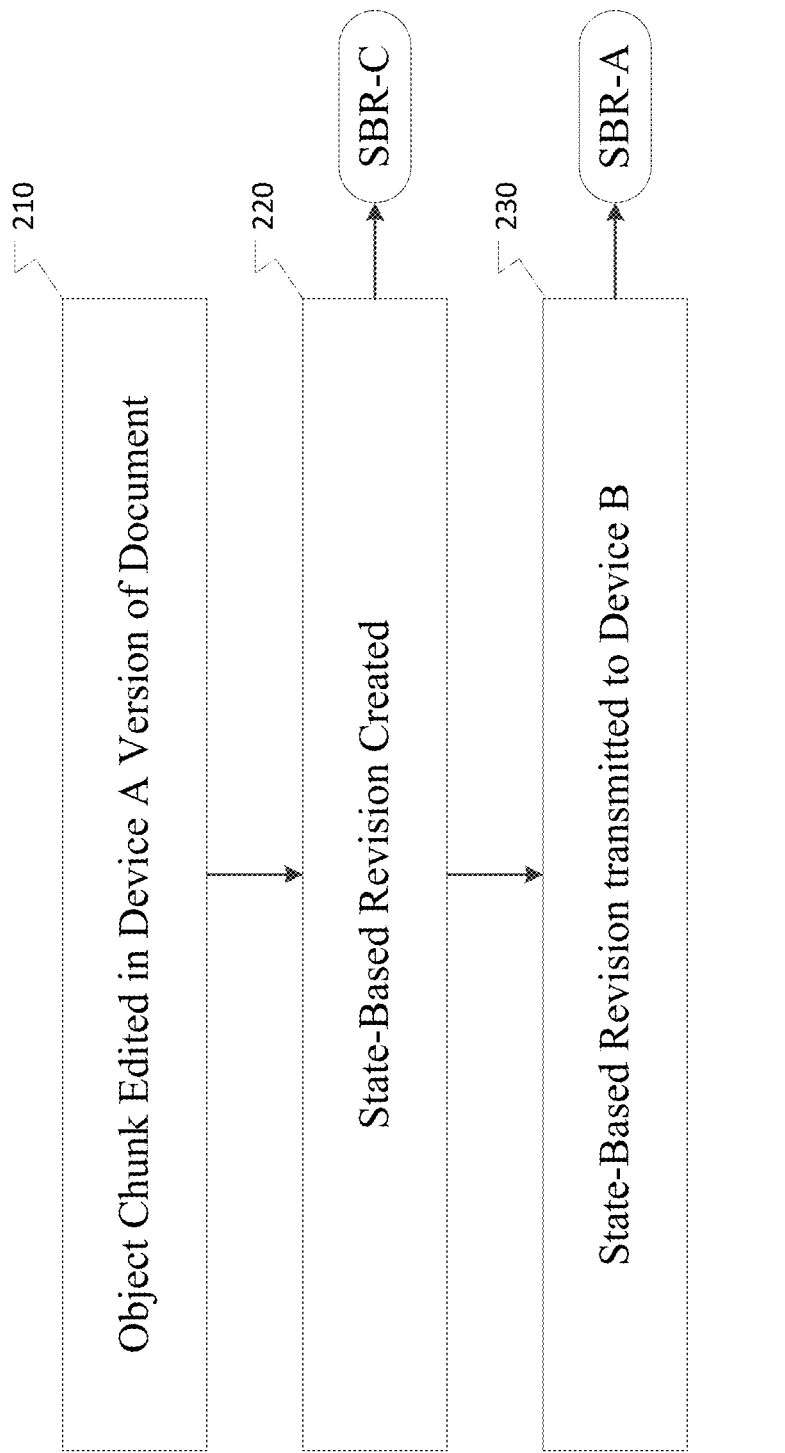

Mobile Computing Device

COLLABORATIVE DOCUMENT EDITING USING STATE-BASED REVISION

CROSS-REFERENCE TO RELATED APPLICATIONS

This application is a continuation application and claims priority to U.S. patent application Ser. No. 14/515,359, filed Oct. 15, 2014, and entitled "COLLABORATIVE DOCUMENT EDITING USING STATE-BASED REVISION," now issued U.S. Pat. No. 10,331,775, which application is incorporated herein by reference in its entirety.

BACKGROUND

Document collaboration systems allow multiple clients to edit a single document or file to achieve a final version of the document or file. Although various technologies have been implemented in such systems, two well-known, yet flawed, approaches have been identified. The first approach is to merge small custom records with the changes of other client through operational transformation. This approach allows for rapid change propagation, but results in poor scaling of the system's logical complexity in terms of complex documents and voluminous operations. The second approach is to send an entire new copy of the document to a receiving client and allow the receiving client to determine the changes to be merged by comparing the new document against a baseline copy of the document. This approach adequately allows for scaling of the system's logical complexity, but does not provide for rapid change propagations.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

The present disclosure provides methods, systems, and computer products for providing state-based revisions in a document collaboration system. In some aspects, a plurality of users may be simultaneously editing the same document on their respective computing devices. The document may comprise a plurality of editable objects having unique objects identifiers. For example, a document may have a chart object, a conditional formatting rule object and a hidden row/column object, each of which is assigned a unique identifier. In some aspects, when a user edits an object in a local version of the document, a state-based revision ("SBR") record is created. As used herein, a SBR record refers to a record consisting of a header section and a body section. The header section contains information describing the type of object being edited, a descriptor that uniquely identifies the specific instance of the object being edited and a collection of common references that can be adjusted by the document collaboration engine. The body section contains an opaque binary stream comprising the modified state of the edited object. The SBR record is then transmitted to one or more additional devices.

These and other features and advantages, which character the present non-limiting aspects, will be apparent from a reading of the following detailed description and a review of the associated drawings. It is to be understood that both the foregoing general description and the following detailed description are explanatory only and are not restrictive of the non-limiting aspects as claimed.

BRIEF DESCRIPTION OF THE DRAWINGS

Non-limiting and non-exhaustive aspects are described with reference to the following Figures in which:

FIG. 1B illustrates the contents of a state-based-revision record, according to one or more aspects of the present disclosure;

FIG. 2 illustrates a method for performing state-based revision records, according to one or more aspects of the present disclosure.

DETAILED DESCRIPTION

Figure 1A:
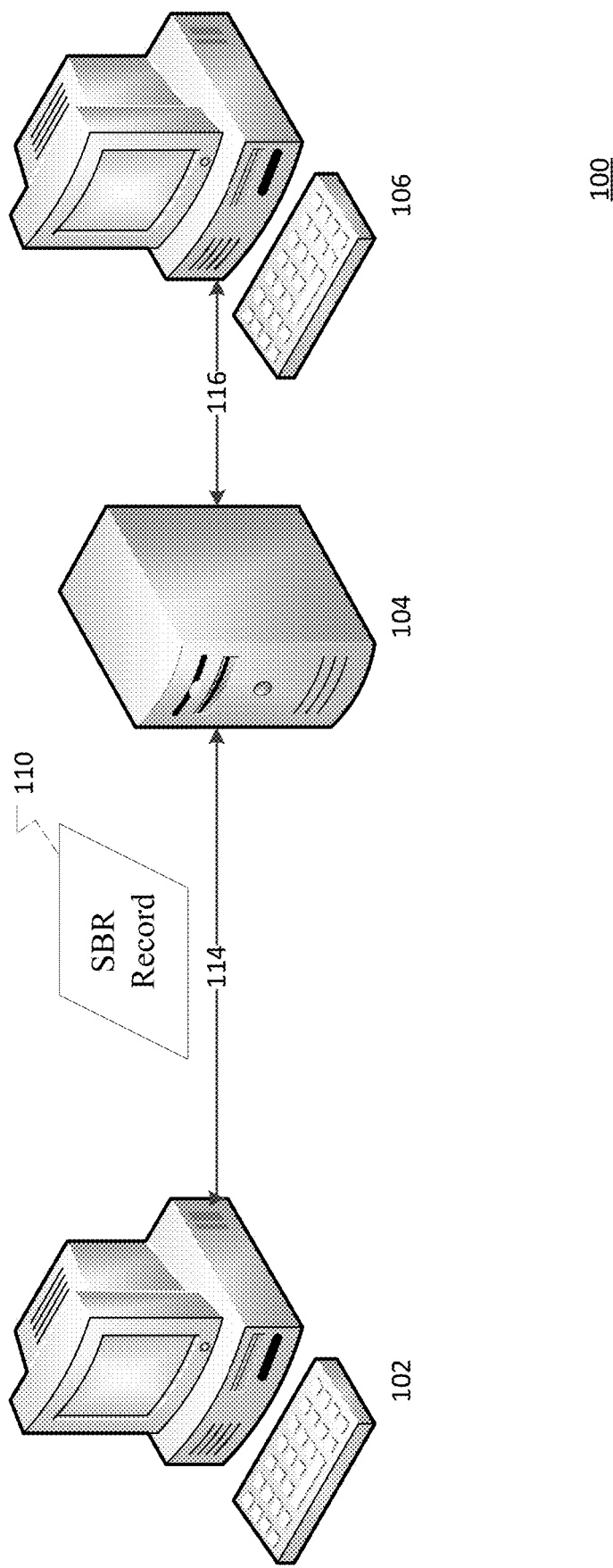
FIG. 1A illustrates a logical representation of a network environment in which users may perform state-based revisions, according to one or more aspects of the present disclosure.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides methods, systems, and computer products for providing state-based revisions in a document collaboration system. In examples, a plurality of users may be simultaneously editing the same document on their respective computing devices. A computing device, as used herein, may refer to computing hardware or software components. For example, a computing device may be personal computer, a laptop, a tablet computing device, a mobile computing device such as, for example, a smartphone or a phablet, one more software applications and/or a set of instructions. The document may comprise a plurality of editable objects having unique objects identifiers. For example, a document may have a chart object, a conditional formatting rule object and a hidden row/column object, each of which is assigned a unique identifier. In examples, when a user edits an object in a local version of the document, a state-based revision ("SBR") record is created. Generally, a SBR record is created when a modification occurs in a document. A SBR record may be contain the modified state of a portion of a document and may be used to effectively communicate modifications to the document by a user to other participating users of a document collaboration system. A SBR may also contain references from the content contained within the SBR record. By transmitting a SBR record to participating users, the participating users may enjoy rapid change propagation during collaboration.

In certain aspects, a SBR record consists of a header section and a body section. Generally, a header is data placed at or near the beginning of a message or a block of data. For example, a header may be an email header, a data packet header, a programming language header file or the like. In the aspects disclosed herein, a header may be a first container within the SBR record. In those aspects, the header section contains information describing the type of object being edited, a descriptor that uniquely identifies the specific instance of the object being edited and a collection of common references that can be adjusted by the document collaboration engine. A body section generally is a portion of data within a message or a block of data. For example, the body section of an email message may contain the text, images and/or links to be communicated to the recipient. In the aspects disclosed herein, the body section may be a second container within the SBR record and may contain an opaque binary stream comprising the modified state of the edited object. After the header section and body section have been populated, the SBR record may be transmitted to one or more additional devices.

In such examples, upon receipt of an SBR record comprising an edit to a remote version of a document, a determination may be made as to whether edits to the local version of the document have been performed. A "document" may include, but is not limited to, a word processing document, a worksheet, a presentation, a workflow project, a web page, etc. A local edit may be a modification to a local version of a document. A local edit may be performed from a local computing device or from a remote computing device that is accessing a document on a local computing device. If local edits have been performed, operational transforms ("OT") may be performed on the SBR record header accordingly. Generally, an operational transform is method for supporting a range of collaborative functionalities. For example, an OT may be used to enforce consistency maintenance and/or concurrency control in collaborative editing of text documents. After the OTs have been performed, or if local edits have not been performed, the SBR record header is analyzed to identify the object within the SBR record. If the object within the SBR record exists within the local version of the document, the object and information describing the object are identified within the local version of the document. The modified object state within the body of the SBR record is then loaded to the identified local object. In certain examples, the modified object state may represent a deletion operation. In such examples, the deletion operation is performed on the identified local object. If the object within the SBR record does not exist within the local version of the document, the object is created within the local version of the document and the modified object state within the body of the SBR record is loaded to the created local object.

FIG. 1A illustrates a system 100 for performing state-based revisions over a peer-to-peer network, an intranet network, and/or a distributed computing network, such as the Internet, according to one or more examples. As shown in FIG. 1A, the system 100 may include a local computing device 102, an intermediate computing device 104 and a remote computing device 106. In certain aspects, local computing device 102, intermediate computing device 104 and remote computing device 106 may establish a communication session with each other over the Internet or via some other form of communication. Local computing device 102, intermediate computing device 104 and remote computing device 106 may be configured to transmit a SBR record 110 to each of the other computing devices within system 110. For example, SBR record 110 may have been created on local computing device 102 as a result of an edit to a local document. SBR record 110 may be sent to intermediate computing device 104 via communication 114. In some aspects, intermediate computing device 104 may populate a portion or all of SBR record 110 before transmitting SBR record 110 to remote computing device 106 via communication 116. For example, SBR record 110 may be populated with an object type of an edited object, a descriptor that uniquely identifies the object instance of the edited object, and/or the edited state of the object. In other aspects, intermediate computing device 104 may simply send SBR record 110 to remote computing device 106. In still other aspects, SBR record 110 may originate at intermediate computing device 104 and be received by local computing device 102 via communication 114. In such as aspect, intermediate computing device 104 may populate all or some of SBR record 110 before sending SBR record 110 to local computing device 102.

Although FIG. 1A shows only one local computing device, one intermediate computing device and one remote computing device, it is contemplated that system 100 may include additional intermediate computing devices and/or additional remote computing devices. For example, a local computing device may be able to connect to multiple intermediate computing devices or to multiple remote computing devices. Likewise, a single intermediate computing devices, such as, for example, intermediate computing device 104 may be configured to connect to multiple remote computing devices. Additionally, the different aspects and functionalities described herein may operate via a multitude of computing systems including, without limitation, desktop computer systems, wired and wireless computing systems, mobile computing systems (e.g., mobile telephones, smart-phones, phablets, wearable computers, netbooks, tablet or slate type computers, notebook computers, and laptop computers), hand-held devices, multiprocessor systems, microprocessor-based or programmable consumer electronics, minicomputers, and mainframe computers.

FIG. 1B illustrates the contents of a SBR record 110, according to one or more examples. In some aspects, SBR record 110 may be created when one or more the users attempt to edit their respective versions of the same documents, such as in a document collaboration system. For example, a user may use a local computing device to edit a local version of a document using a spreadsheet application, a word processing application, a presentation application, a computer code editor, etc. If the user were to create a data validation rule for cells C3 through D4 within a spreadsheet, a SBR record may be created to reflect the state-based revision performed by the user. SBR record 110 may be created by intermediate computing device 104 and sent to local computing device 102 via communication 114. At the time of creation, SBR record 110 may be populated by intermediate computing device 104 with information provided in a call to the collaboration infrastructure. Such information may include the object and/or information associated with the object. SBR record 110 may include a header section 115 and a body section 125. Header section 115 may refer to data placed at or near the beginning of a message or a block of data. For example, Header section 115 may be a first container within the SBR record and may be populated with information, as described above. Header section 115 may be object-independent; that is, header section 115 may be capable of being processed by a common engine regardless of the specific object type contained within the SBR record. The object-independent nature of the header allows the OT logic of system 100 to scale based on the quantity of reference types in the system, instead of the quantity of actual records or operations the system possesses.

Header section 115 may comprise information identifying the type of object being edited 117, a descriptor that uniquely identifies the specific instance of the object being edited 119 and/or one or more virtualized references to content that is outside of the state of the object 121. Generally, an object type is a data type used in object-oriented programming to wrap a non-object/primitive type. Object type may represent a data structure, functions and/or procedures to manipulate the data. In some aspects, Information 117 may indicate data structure, functions and/or procedures associated with an edited object. A virtualized reference generally refers to a virtual token used to replace data and/or other content associated with a document and/or object. For instance, the virtual token 'text' may be used to represent the entire body of an email message. To continue with the above example, the SBR header created by the user's revision may indicate an object type identifier of 'Data Validation', an object identifier of 'Data_Validation_Rule_1' and a virtualized cell reference of the affected data range, e.g., 'ref'=C3:D4'. In some aspects, because header section 115 may comprise the virtualized references to external content, the virtual references may be updated and/or modified within OTs while maintaining the immutable status of the external content.

Body section 125 may refer to a portion of data within a message or a block of data. For example, the body section may be a second container within the SBR record and may be populated with information upon creation or when the SBR record is received by the user computing device. In some aspects, body section 125 may comprises an opaque binary stream comprising the modified state of the edited object 127. A binary stream may consist of one or more bytes of data. In some aspects, an object or data associated with an edited object may be serialized into a binary stream representing the object or associated object data. Further continuing with the above example, the SBR body created by the user's revision may contain a binary stream of information indicating that the edit 'Applies to range ref1', 'Criteria: Number>3' and 'Error String: Invalid Input'.

FIG. 2 is a flowchart of a method for performing state-based revision records, according to one or more examples of the present disclosure. Method 200 may be executed, for instance, by local computing device 102, described above. Method 200 may alternatively be executed by any suitable computing device capable of performing state-based revisions in a document collaboration system. The method 200 may be implemented in software, hardware or a combination of software and hardware. At operation 210, a user edits an object in a local version of a document. A "document" may include, but is not limited to, a word processing document, a worksheet, a presentation, a workflow project, a web page, etc. An "object" or an "object chunk" may refer to a chart, a conditional formatting rule object, a text box, an image, a link, a span or rows/columns, and the like. The type of the object depends on the type of the document. For example, if the document is a spreadsheet, an object may be a cell or column. If the document is a word processing document, an object may be a paragraph of text, an image, etc. Although the collaborative aspects of the document collaboration system discussed herein are typically invoked when two or more users are simultaneously editing the same document, it is contemplated that a SBR record may also be created when a single user is actively editing a document in the document collaboration system. At operation 220, a state-based revision may be created in response to editing the object. Editing the object may include operations such as creating a new object, modifying the value of the object, modifying the state and/or properties associated with the object and removal and/or deletion of the object. At operation 230, the SBR record is transmitted to one or more additional devices. The SBR record may be transmitted directly to a remote computing device or may be transmitted to an intermediary computing device using a communication channel, such as communication 116, before being transmitted to a remote computing device.

Figure 3:
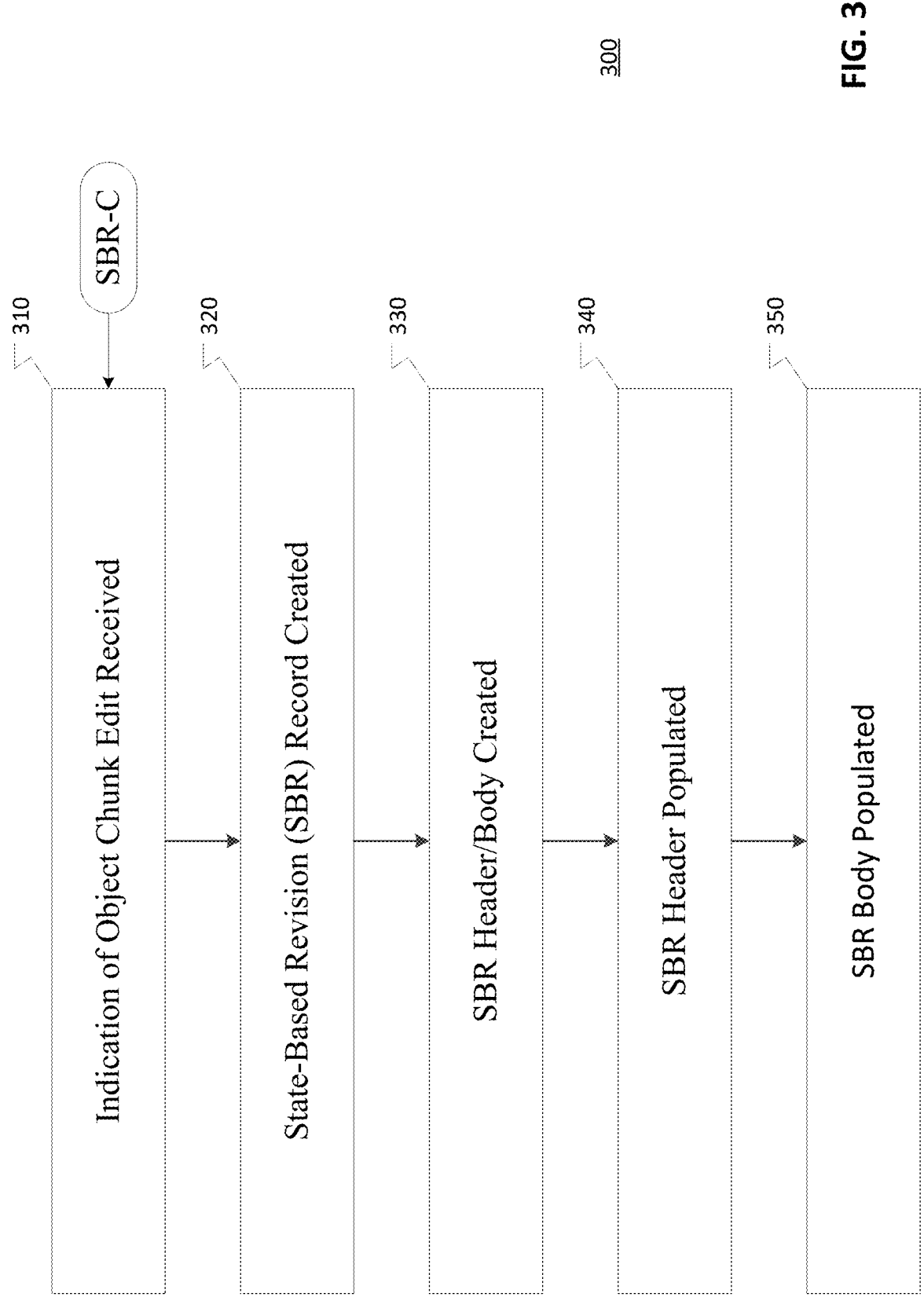
FIG. 3 illustrates a method for creating state-based revision records, according to one or more aspects of the present disclosure.

FIG. 3 is a flowchart of a method for creating state-based revision records, according to one or more examples of the present disclosure. The method 200 may be implemented in software, hardware or a combination of software and hardware. At operation 310, machine code associated with the edited object may perform a call to the document collaboration infrastructure. In aspects, the machine code may be located on the local device, an intermediate device or a remote device. In general terms, the call is a sequence of program instructions that performs a specific task. For example, the call may be described as a function call, a procedure call, a routine call, a method call, a subroutine call, etc. The call contains information identifying various aspects of the edited object and notifies the document collaboration infrastructure of the edited object. At operation 320, the document collaboration infrastructure is prompted to create a record describing the edit. A SBR record container is created in response to the prompt. At operation 330, the SBR header and body sections are created within the SBR record container. In some aspects, the SBR header and body sections are empty containers at creation. At operation 340, the header section is populated using the information within the call. For example, the document collaboration infrastructure populates the header section with an object type of the edited object and a descriptor that uniquely identifies the object instance of the edited object.

At operation 350, the body section is populated. In some examples, the modified state of the edited object is passed directly into the document collaboration infrastructure. In other examples, the document collaboration infrastructure may use the information within the call to perform a separate call to feature code. For example, information within the call may identify the feature to request and/or which specific object to request. The feature code may then populate the body section with the modified state of the edited object. After the body section is populated, the content of the body section is serialized into a data stream containing the revision. During serialization, references to content outside of the edited object's state may be detected and replaced with a unique identifier, a virtualized token and/or the like. This virtual tokenization of references provides a layer of indirection between the object state that contains the reference and the reference itself, which allows for modification of the reference without requiring knowledge of the object the reference is within. The mappings between the virtualized tokens and their corresponding references may further populate the header section. In certain aspects, the body section may be populated with a null object to indicate the deletion or an object or the removal of an object state.

Figure 4:
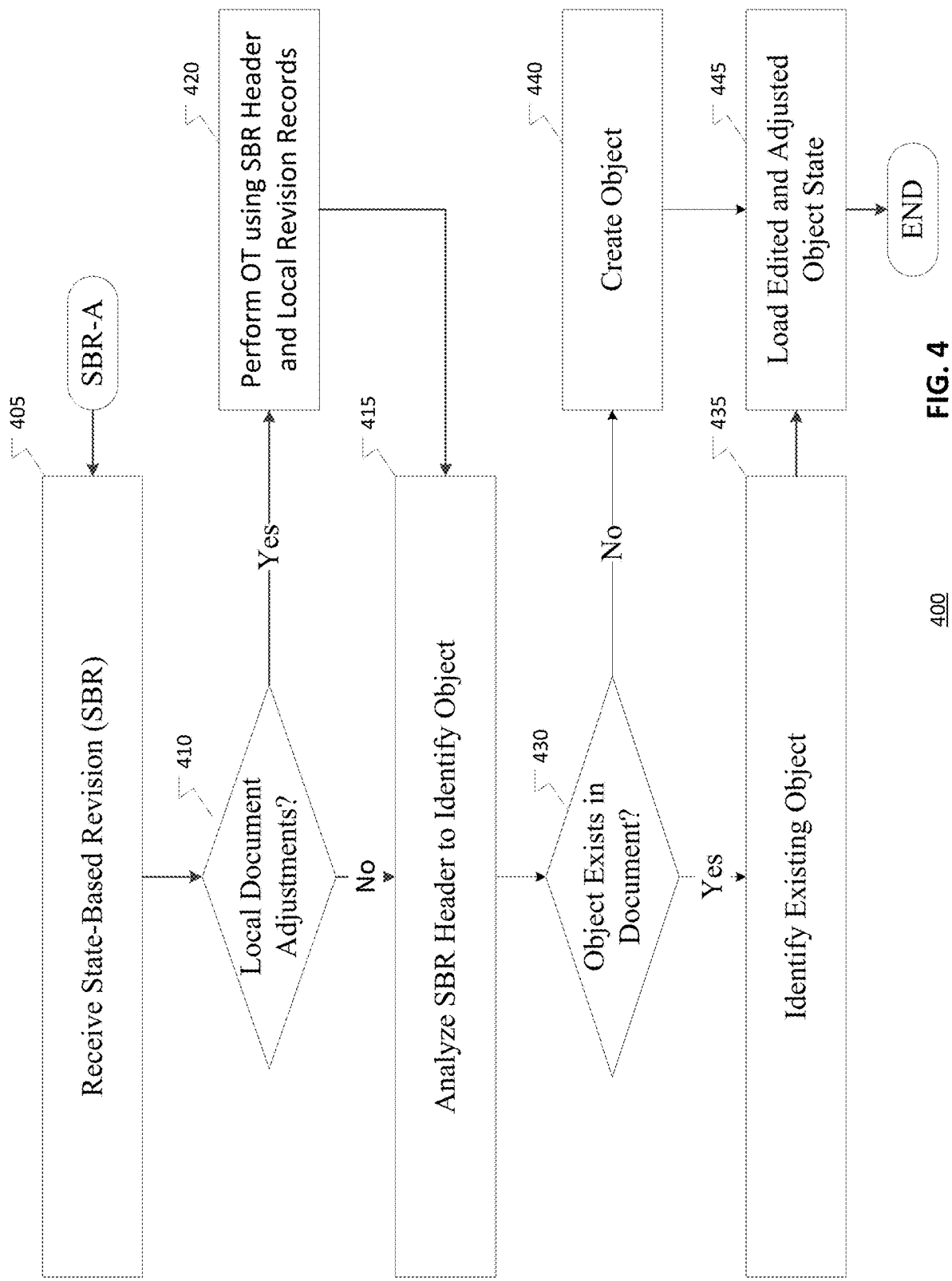
FIG. 4 illustrates a method for applying state-based revision records, according to one or more aspects of the present disclosure.

FIG. 4 is a flowchart of a method for applying state-based revision records, according to one or more examples of the present disclosure. The method 400 may be implemented in software, hardware or a combination of software and hardware. Method 400 may be performed by any of the computing devices in FIG. 1A. At operation 405, the SBR record is received at a computing device, such as remote computing device 106. In certain aspects, the computing device contains the document collaboration infrastructure and the logic to transmit the SBR record to one or more alternate computing devices. The users of the one or more alternate computing devices, or some combination thereof, may be simultaneously editing their respective versions of the document containing the edited object. In such aspects, the alternate computing devices receive the respective edits. Alternately, the users of the one or more alternate computing devices, or some combination thereof, may be simply be accessing their respective versions of the document. In other examples, the computing device contains a version of the document that is local to the computing device. The user may be editing the local version of the document, accessing the local version of the document or may possess a local version of the document. At determination 410, a determination is made as to whether local edits to the Device B version of the document have been performed. If it is determined that local edits have not been performed, the flow proceeds to operation 415. If it is determined that local edits have been performed, the flow proceeds to operation 420.

At operation 420, a corresponding SBR record may be created if the local edits result in a state-based change to an object in the Device B version of the document. If the local changes do not result in a state-based change to an object in the Device B version of the document, the local changes may simply be applied. OTs may then be performed on the received SBR header to reflect the local changes applied to the Device B version of the document. Consider the following example: In response to User A adding data validation identified as 'DV1' onto cell D13 of document X, a SBR is produced with the header 'DV1'. When serializing 'DV1'', cell D13 is identified as a reference external to the data validation and is tokenized as 'ref''. Simultaneously, User B inserts a row into document X above row 13. When User B receives User A's SBR record, User B performs an OT on the SBR record. As the reference to D13 is stored in the header, it is visible to the OT method, which may adjust it to D14 to account for the row inserted by User B. After the OT is complete, User A's SBR record specifies an edit to object 'DV1'' and the header includes a mapping of 'ref'' to D14. In operation 415, the SBR record is analyzed in order to identify the edited object. Analyzing the SBR record includes parsing the header to extract information relating to the edited object. In determination 430, a determination is made as to whether the object identified in the SBR record header exists in the Device B version of the document. If the object exists in the Device B version of the document, the object and information associated with the object are identified in operation 435. The flow proceeds to 445. If the object does not exist in the Device B version of the document, an instance of the object is created at flow 440. In operation 445, the identified or created object is loaded with the edited and adjusted object state in the SBR record body. The flow then terminates.

The examples and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the examples and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which examples of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
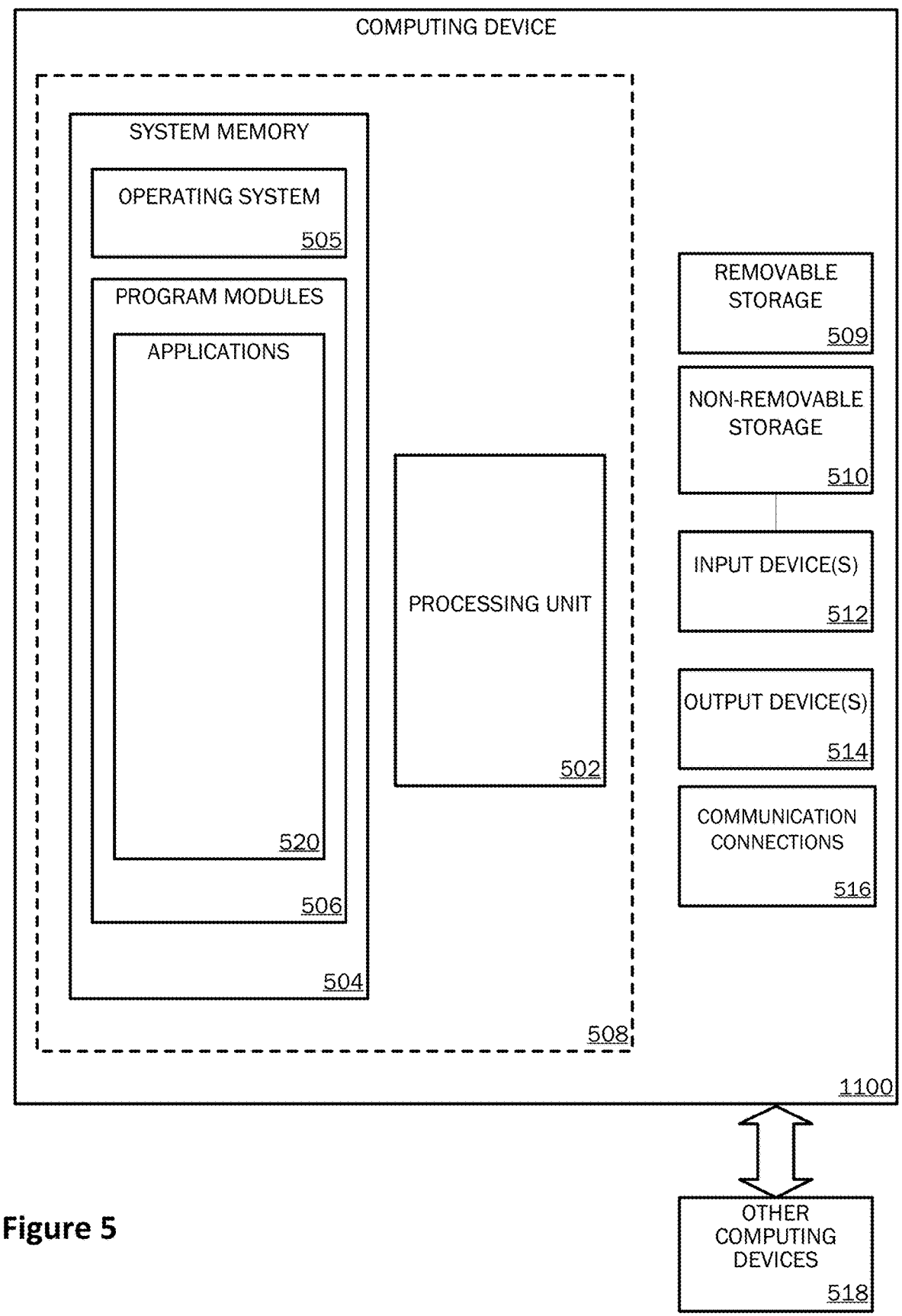
FIG. 5 is a block diagram illustrating example physical components of a computing device that may be used with one or more aspects of the present disclosure.
Figure 6A:
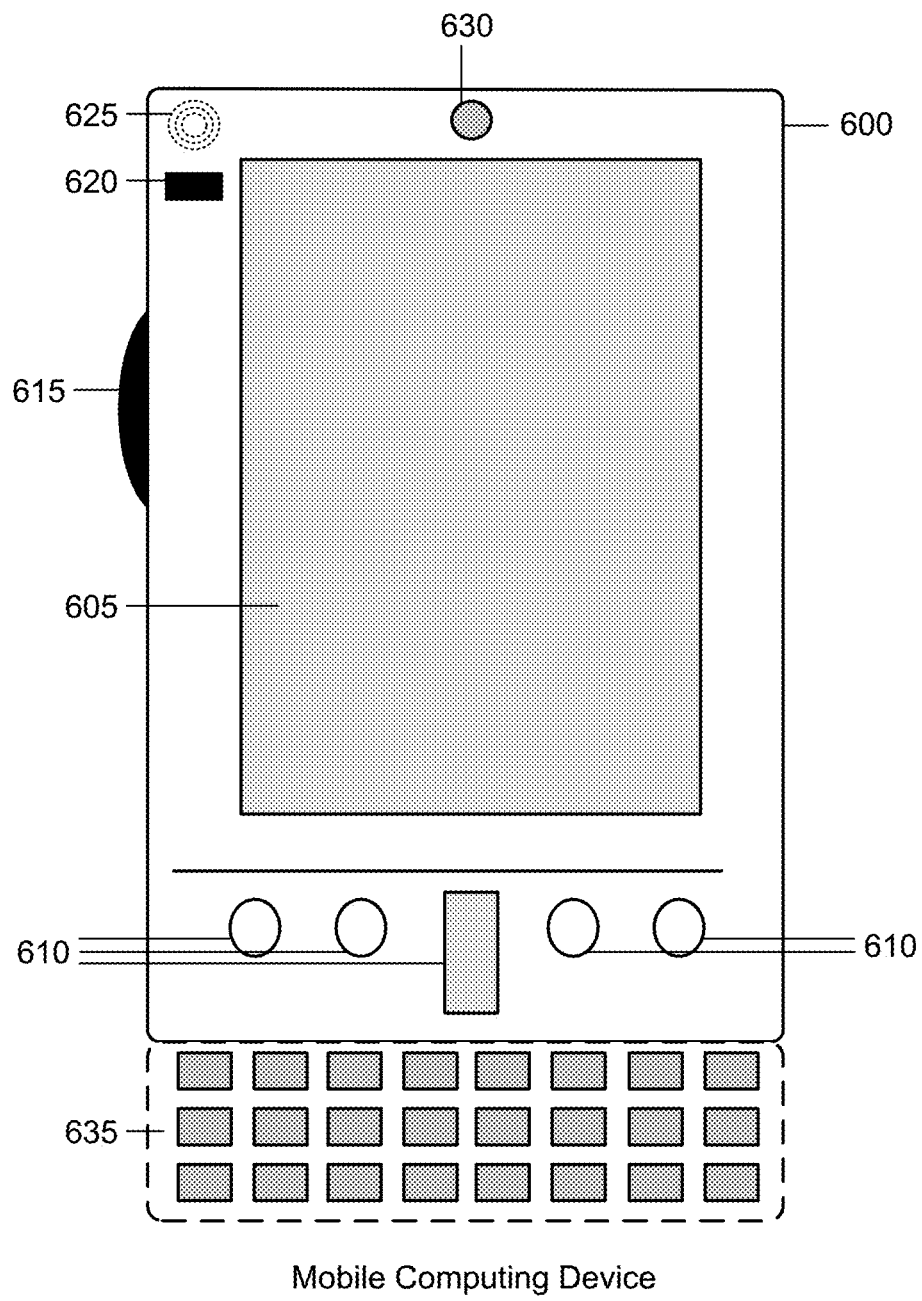
FIGS. 6A and 6B are simplified block diagrams of a mobile computing device that may be used with one or more aspects of the present disclosure.
Figure 6B:
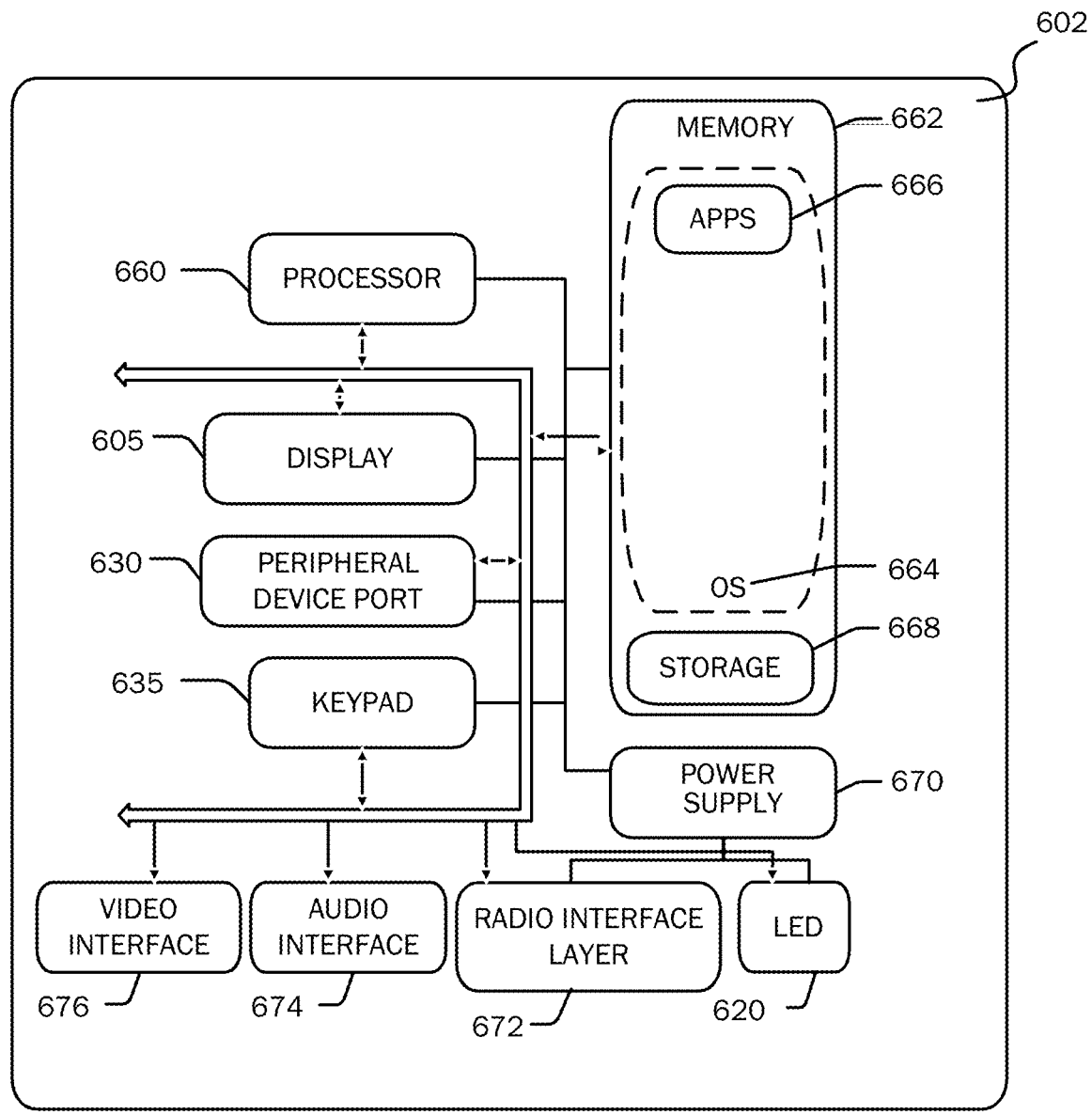
Figure 7:
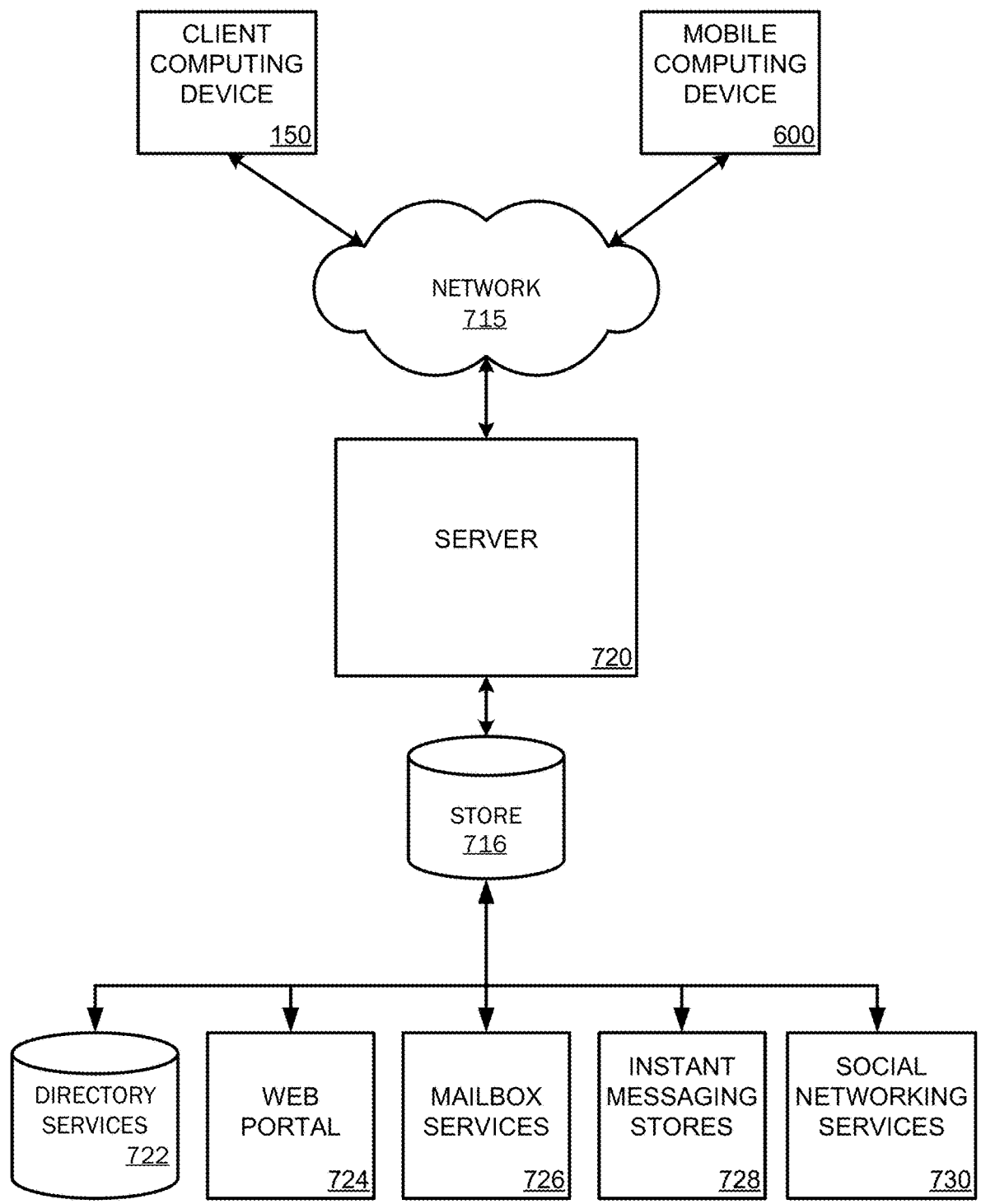
FIG. 7 is a simplified block diagram of a distributed computing system that may be used with one or more aspects of the present disclosure.

FIGS. 5-7 and the associated descriptions provide a discussion of a variety of operating environments in which examples of the present disclosure may be practiced. However, the devices and systems illustrated and discussed with respect to FIGS. 5-7 are for purposes of example and illustration and are not limiting of a vast number of computing device configurations that may be utilized for practicing examples described herein.

FIG. 5 is a block diagram illustrating physical components (i.e., hardware) of a computing device 1100 with which examples of the present disclosure may be practiced. The computing device components described below may be suitable for the computing devices described above including the server computing device 110 and the client computing device 150. In a basic configuration, the computing device 1100 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520 such as those supported by remote application programs described herein. The operating system 505, for example, may be suitable for controlling the operation of the computing device 1100. Furthermore, examples of the present disclosure may be practiced in conjunction with a graphics library, other operating systems, or any other application program and is not limited to any particular application or system. This basic configuration is illustrated in FIG. 5 by those components within a dashed line 508. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the stages of the operational flows 200-400 illustrated in FIGS. 2-4. Other program modules that may be used in accordance with examples of the present disclosure may include electronic mail and contacts applications, word processing applications, spreadsheet applications, database applications, slide presentation applications, drawing or computer-aided application programs, etc.

Furthermore, examples of the present disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 1100 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the present disclosure may be practiced within a general purpose computer or in any other circuits or systems.

The computing device 1100 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 1100 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which examples of the present disclosure may be practiced. With reference to FIG. 6A, one embodiment of a mobile computing device 600 for implementing the examples is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (i.e., an architecture) 602 to implement some examples. In one embodiment, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with examples of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one embodiment of the architecture of a system for transferring data between different computing devices as described above. The data transferred between client computing device 150 and the server computing device 110 may be stored in different communication channels or other storage types. For example, various documents may be stored using a directory service 722, a web portal 724, a mailbox service 726, an instant messaging store 728, or a social networking site 730. A server 720 may provide data to and from client computing device 150. As one example, the server 720 may be a web server. The server 720 may provide data to client computing device 150 or mobile computing device 600 over the web through a network 715. By way of example, the Node A 110 or Node B 115 may be embodied in a personal computer, a tablet computing device and/or a mobile computing device 600 (e.g., a smart phone). Any of these examples may obtain content from the store 716.

Among other examples, the present disclosure presents systems and methods for performing state-based revisions in document collaboration systems, comprising: initiating, on a first computing device, a document editing session for a local version of a document; creating a state-based revision, wherein the state-based revision comprises: the at least one modification; and a virtualized reference to content associated with the at least one modification; and sending the state-based revision to a second computing device. In further examples, the at least one modification identifies a modification to an object within the document. In further examples, the state-based revision further comprises a header section and a body section. In further examples, the header section comprises at least one of information identifying the type of the object being modified, a unique descriptor identifying the object being modified and a reference to content peripheral to the state of the object. In further examples, the header section is object-independent. In further examples, the body section comprises the at least one modification. In further examples, the at least one modification is serialized into a data stream, wherein serializing the at least one modification comprises detecting whether content peripheral to the state of the object is present. In further examples, when content peripheral to the state of the object is detected, replacing the content with a reference to the content, wherein the reference to the content is at least one of a unique identifier and a virtualized token.

Further aspects disclosed herein provide a computer-readable media storing computer executable instructions that when executed cause a computing system to produce a state-based revision record associated with an object, the state-based revision record comprising: a generalized header section, wherein the generalized header section is object independent, and wherein the generalized header section comprises: information identifying an object type for the object; and at least one virtualized reference to a portion of the object; and a body section, wherein the body section comprises the at least one modification. In further examples, the generalized header section further comprises a unique descriptor of the object being modified. In further examples, the at least one virtualized reference represents an immutable status of the object. In further examples, the at least one virtualized reference is capable of modification within an operational transform. In further examples, the at least one modification identifies a modification to the object. In further examples, the at least one modification is serialized into a data stream, wherein serializing the at least one modification comprises detecting whether a portion of the object is peripheral to the state of the object. In further examples, when the portion of the object is peripheral to the state of the object, the portion of the object is replaced with a virtualized reference to the portion of the object.

Additional aspects disclosed herein provide a document collaboration system for performing state-based revisions, the document collaboration system comprising: a computing device, comprising a processor; and memory coupled to the processor, the memory comprising computer executable instructions that, when executed by the processor performs a method comprising: separating a first document into a plurality of object chunks, wherein plurality of object chunks comprises a first object chunk in the plurality of object chunks is associated with a first object state; editing the document, wherein editing the document produces at least one modification to the first object chunk; and creating a state-based revision, wherein the state-based revision comprises: the at least one modification to the first object chunk; and a virtualized reference to content associated with the first object chunk. In further examples, the state-based revision further comprises a header section and a body section. In further examples, the header section comprises at least one of information identifying the type of the object associated with the first object chunk, a unique descriptor identifying the object chunk and a reference to content peripheral to the state of the object chunk. In further examples, the body section comprises the at least one modification to the object chunk. In further examples, the header section is object-independent.

Additional aspects disclosed herein provide a document collaboration means for performing state-based revisions, the document collaboration system comprising: a computing device, comprising a processor; and memory coupled to the processor, the memory comprising computer executable instructions that, when executed by the processor performs a method comprising: separating a first document into a plurality of object chunks, wherein plurality of object chunks comprises a first object chunk in the plurality of object chunks is associated with a first object state; editing the document, wherein editing the document produces at least one modification to the first object chunk; and creating a state-based revision, wherein the state-based revision comprises: the at least one modification to the first object chunk; and a virtualized reference to content associated with the first object chunk. In further examples, the state-based revision further comprises a header section and a body section. In further examples, the header section comprises at least one of information identifying the type of the object associated with the first object chunk, a unique descriptor identifying the object chunk and a reference to content peripheral to the state of the object chunk. In further examples, the body section comprises the at least one modification to the object chunk. In further examples, the header section is object-independent.

Examples of the present disclosure, for example, are described above with reference to block diagrams and/or operational illustrations of methods, systems, and computer program products according to examples of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure as claimed in any way. The examples, examples, and details provided in this application are considered sufficient to convey possession and enable others to make and use the best mode of the claimed examples. The claimed examples should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed examples.

We claim:

1. A system comprising:
   a processor; and
   memory coupled to the processor, the memory comprising computer executable instructions that, when executed by the processor performs a method of editing a document, the method comprising:
   producing at least one modification to an object associated with the document;
   creating a state-based revision, wherein the creating comprises:
   detecting whether content peripheral to the object is present; and
   populating a header section and a body section of the state-based revision using the at least one modification and a virtualized reference to the content peripheral to the object; and
   sending the state-based revision to a computing device.

2. The system of claim 1, wherein creating the state-based revision further comprises:
   creating a state-based revision container; and
   creating the header section and the body section within the state-based revision container.

3. The system of claim 1, wherein the header section is further populated with an object type of the object and a descriptor identifying an object instance of the object.

4. The system of claim 3, wherein the object type represents a data structure, a function, or a procedure used to manipulate the object.

5. The system of claim 1, wherein, after the header section is populated, content of the populated header section is serialized into a data stream comprising the at least one modification.

6. The system of claim 1, wherein, when the content peripheral to the object is detected, the content is replaced with the virtualized reference.

7. The system of claim 6, wherein a mapping that maps the virtualized reference to the content is added to the header section.

8. The system of claim 1, wherein the at least one modification corresponds to a deletion of the object, and a null object representing the at least one modification is added to the body section.

9. The system of claim 1, wherein producing the document comprises editing a first local version of the document using an editing device while a first user of the editing device and a second user of the computing device are simultaneously accessing the document.

10. The system of claim 1, wherein the computing device is an intermediate device for transferring a received state-based revision to a receiving device accessing the document.

11. A method of editing a document, the method comprising:
   producing, using a first computing device, at least one modification to an object associated with the document;
   creating a state-based revision based on the at least one modification, wherein the state-based revision comprises a header section and a body section;
   when content peripheral to the object is identified, replacing the content with a virtualized reference to the content peripheral to the object;
   populating the header section and the body section using the at least one modification and the virtualized reference; and
   sending the state-based revision to a second computing device.

12. The method of claim 11, wherein, when the document is produced, the document is being accessed by a first user using the first computing device and a second user using the second computing device.

13. The method of claim 11, wherein the state-based revision is created using a document collaboration system accessible to the first computing device and the second computing device.

14. The method of claim 13, wherein the header section is object-independent such that the header section is capable of being processed by a common engine regardless of object types within the state-based revision.

15. The method of claim 14, wherein the object-independent header section enables operational transform logic of the document collaboration system to scale based on a quantity of reference types in the document collaboration system.

16. The method of claim 11, wherein populating the header section and the body section comprises serializing the at least one modification into an opaque binary stream.

17. The method of claim 11, wherein replacing the content with the virtualized reference to the content comprises creating a mapping of the virtualized reference to the content.

18. The method of claim 11, wherein the virtualized reference represents an immutable status of the object.

19. The method of claim 11, wherein the virtualized reference is a virtual token providing a layer of indirection between an object state comprising the virtualized reference and the virtualized reference.

20. A method of editing a document, the method comprising:
   producing, using a first computing device, at least one modification to an object associated with the document;
   creating a state-based revision, wherein the creating comprises:
      detecting whether content peripheral to the object is present; and
      populating a header section and a body section of the state-based revision using the at least one modification and a virtualized reference to the content peripheral to the object; and
   sending the state-based revision to a second computing device.

* * * * *